(12) United States Patent
Sivasubramaniam et al.

(10) Patent No.: US 7,928,616 B2
(45) Date of Patent: Apr. 19, 2011

(54) SYSTEMS AND APPARATUS INVOLVING TOOTHED ARMATURES IN SUPERCONDUCTING MACHINES

(75) Inventors: Kiruba Haran Sivasubramaniam, Clifton Park, NY (US); James William Bray, Niskayuna, NY (US); Patrick Lee Jansen, Scotia, NY (US); Evangelos Trifon Laskaris, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 162 days.

(21) Appl. No.: 12/123,061

(22) Filed: May 19, 2008

(65) Prior Publication Data

US 2009/0284086 A1    Nov. 19, 2009

(51) Int. Cl.
*H02K 9/19* (2006.01)
*H02K 9/193* (2006.01)
*H02K 9/197* (2006.01)

(52) U.S. Cl. ............... 310/52; 310/54; 310/58; 310/59; 310/61; 310/113

(58) Field of Classification Search .............. 310/52, 310/54, 55, 58, 59, 113, 201
See application file for complete search history.

(56) References Cited

U.S. PATENT DOCUMENTS

| | | | | |
|---|---|---|---|---|
| 4,013,908 A | * | 3/1977 | Weghaupt | 310/61 |
| 7,211,919 B2 | * | 5/2007 | Kalsi et al. | 310/216.113 |
| 7,547,999 B2 | * | 6/2009 | Laskaris et al. | 310/52 |
| 2002/0121830 A1 | * | 9/2002 | Tong et al. | 310/214 |
| 2003/0011253 A1 | * | 1/2003 | Kalsi et al. | 310/58 |
| 2003/0075996 A1 | * | 4/2003 | Yoshida et al. | 310/58 |
| 2004/0081561 A1 | * | 4/2004 | Iwanami et al. | 417/42 |
| 2004/0239201 A1 | | 12/2004 | Sivasubramaniam et al. | |
| 2004/0239202 A1 | * | 12/2004 | Dooley | 310/184 |
| 2005/0012397 A1 | * | 1/2005 | Weeber et al. | 307/78 |
| 2006/0279164 A1 | * | 12/2006 | Blum | 310/261 |
| 2008/0197633 A1 | | 8/2008 | Laskaris et al. | |

* cited by examiner

*Primary Examiner* — Quyen Leung
*Assistant Examiner* — Terrance Kenerly
(74) *Attorney, Agent, or Firm* — Ann M. Agosti

(57) ABSTRACT

A system for generating power comprising, a superconducting generator including, an armature assembly comprising, a body portion, a tooth portion having a front surface and a rear surface, a slot partially defined by the body portion and the tooth portion, an armature bar engaging the slot, and a cooling cavity partially defined by the tooth portion, communicative with the front surface and the rear surface.

22 Claims, 7 Drawing Sheets

SYSTEMS AND APPARATUS INVOLVING TOOTHED ARMATURES IN SUPERCONDUCTING MACHINES

BACKGROUND OF THE INVENTION

The described embodiments relate generally to superconducting generators and motors, and more particularly to systems involving generator and motor armatures with superconducting field windings.

The superconducting field windings in superconducting motors and generators generate high magnetic fields in excess of the magnetic saturation of the magnetic teeth usually present in a stator, Superconducting motors and generators use complex assemblies of armature coils, cooling features, and nonmagnetic teeth between bars in the armatures to avoid losses in the saturated teeth. The use of these features adds cost for materials and assembly of the generators and motors.

BRIEF DESCRIPTION OF THE INVENTION

An exemplary embodiment includes a system for generating power comprising, a superconducting generator including, an armature assembly comprising, a body portion, a tooth portion having a front surface and a rear surface, a slot partially defined by the body portion and the tooth portion, an armature bar engaging the slot, and a cooling cavity partially defined by the tooth portion, communicative with the front surface and the rear surface.

An alternate exemplary embodiment includes an electrical motor system comprising, a superconducting motor including, an armature assembly comprising, a body portion, a tooth portion having a front surface and a rear surface, a slot partially defined by the body portion and the tooth portion, an armature bar engaging the slot, and a cooling cavity partially defined by the tooth portion, communicative with the front surface and the rear surface.

Another alternate exemplary embodiment includes an armature assembly of an electrical apparatus comprising, a body portion, a tooth portion having a front surface and a rear surface, a slot partially defined by the body portion and the tooth portion, an armature bar engaging the slot, a slot wedge member operative to engage the slot, and a cooling cavity partially defined by the tooth portion, communicative with the front surface and the rear surface.

BRIEF DESCRIPTION OF THE DRAWINGS

These and other features, aspects, and advantages will become better understood when the following detailed description is read with reference to the accompanying drawings in which like characters represent like parts throughout the drawings, wherein.

DETAILED DESCRIPTION OF THE INVENTION

In the following detailed description, numerous specific details are set forth in order to provide a thorough understanding of various embodiments. However, the embodiments may be practiced without these specific details. In other instances, well known methods, procedures, and components have not been described in detail.

Further, various operations may be described as multiple discrete steps performed in a manner that is helpful for understanding the embodiments. However, the order of description should not be construed as to imply that these operations need be performed in the order they are presented, or that they are even order dependent. Moreover, repeated usage of the phrase "in an embodiment" does not necessarily refer to the same embodiment, although it may. Lastly, the terms "comprising," "including," "having," and the like, as used in the present application, are intended to be synonymous unless otherwise indicated.

Motor and generator systems that use superconducting field windings may use complex assemblies of armature coils, cooling systems, and nonmagnetic teeth disposed between bars in the armature. Generator and motor systems experience losses from alternating current (AC) current in the armature; this occurs through eddy currents induced in the metals and magnetic hysteresis in the magnetic components, and these losses increase as AC frequency increases. The superconducting field windings often produce magnetic fields in excess of the saturation value of the magnetic teeth, and this, coupled with the AC effects, results in high losses. Non-magnetic teeth or removal of the teeth can be used to reduce the losses, but this may result in a complex fabrication methods.

It is desirable for an electrical system to have a less expensive armature assembly that is easier to manufacture and is capable of operating with a highly magnetically saturated armature teeth assembly with minimal AC current losses. This can be accomplished by constructing the teeth of the same metal (e.g., commonly, silicon iron) as and as extensions of the main magnetic body. Since in saturation the teeth no longer serve a magnetic function, the teeth may be designed and constructed for optimal structural and thermal performance.

Figure 1:
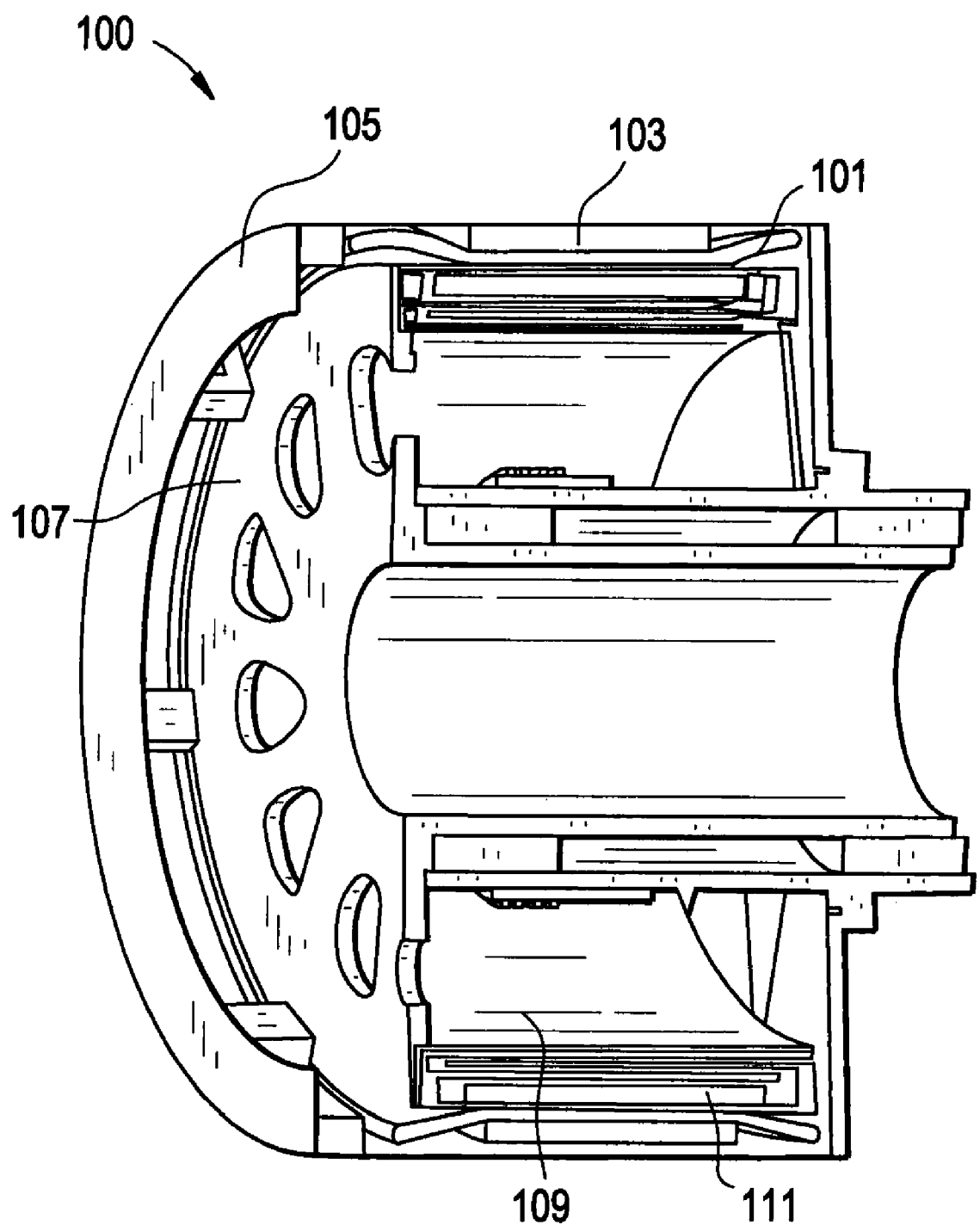
FIG. 1 illustrates a perspective partially cut-away view of an exemplary embodiment of an electrical device.

FIG. 1 illustrates a perspective partially cut-away view of an electrical device 100 having a superconducting field winding. The electrical device 100 is configured as a generator. However, a similar device may be configured as an electrical motor. The electrical device 100 includes an armature portion 105 that includes an armature assembly 101. The armature assembly contacts a yoke portion 103. The electrical device 100 also includes a field assembly 107 that comprises a cryostat 109 with a superconducting coil 111 inside the cryostat.

The electrical device 100 is configured such that the armature portion 105 rotates around the field assembly 107. Other similar embodiments may be configured such that the armature portion 105 is stationary and the field assembly 107 rotates. The electrical device may receive mechanical energy from a prime mover (not shown) to generate electrical power. Alternatively, the electrical device 100 may be configured as a motor that receives electrical power, and converts the electrical power to mechanical energy.

Figure 2:
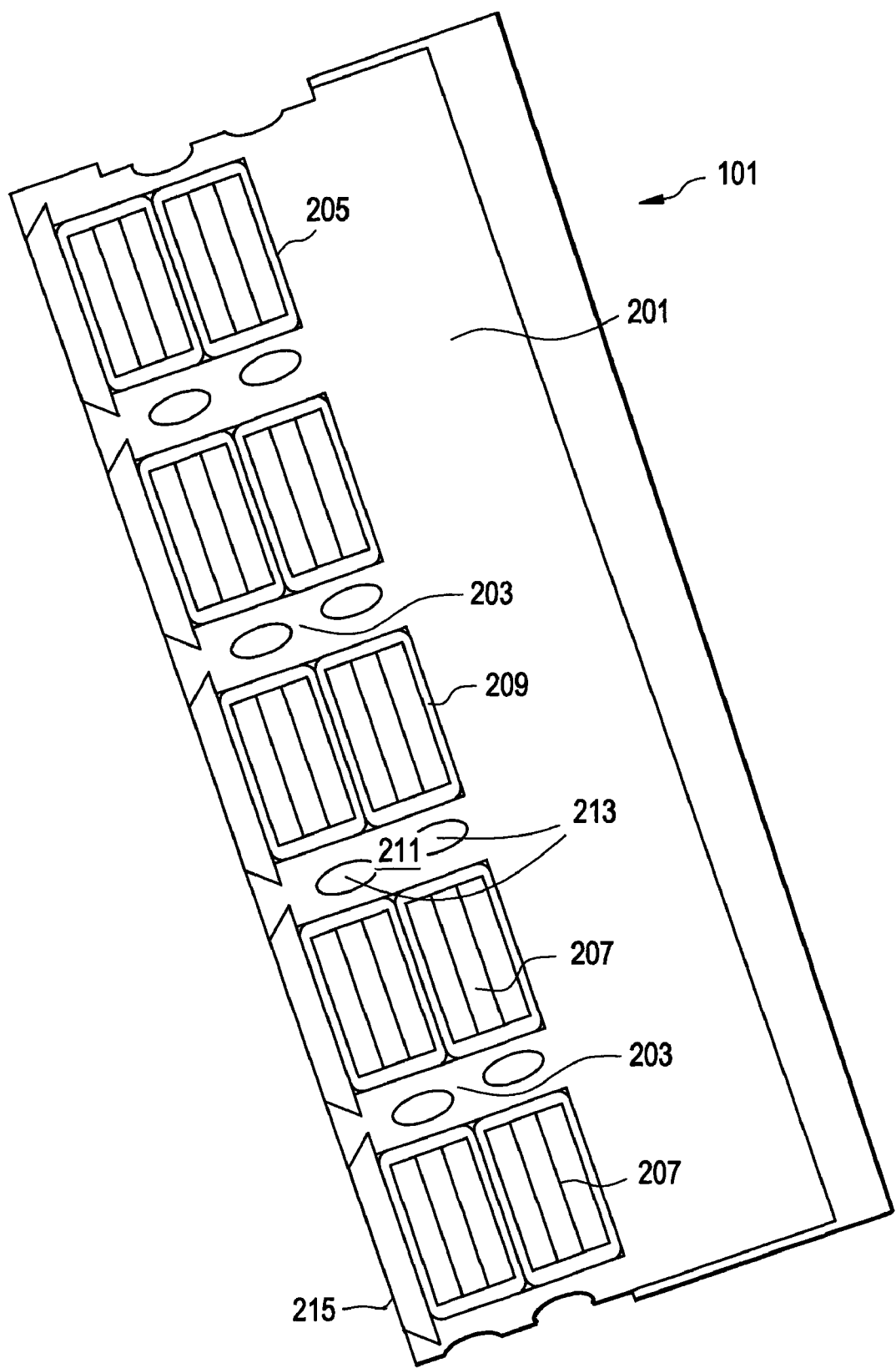
FIG. 2 illustrates a side partially cut away view of an armature assembly of the electrical device of FIG. 1.

FIG. 2 illustrates a side partially cut-away portion of an exemplary embodiment of the armature assembly 101. The armature assembly 101 includes a body portion 201 that may, for example, be fabricated from laminated layers of metal. Teeth portions 203 contact the body portion 201 and may, for example, comprise of the same material as the body portion 201, material such as, for example, laminated silicon-iron. The teeth portions 203 may be an extension of the material that comprises the body portion 201. The body portion 201 and the teeth portions 203 partially define slots 205. Armature bars 207 engage the slots 205. The armature bars 207 may be electrically insulated by insulator portions 209. FIG. 2 shows the front surface 211 of the teeth portions 203. Cooling cavities 213 are partially defined by the teeth portions 203 and are communicative between the front surface 211 and a rear surface 212 of the teeth portions 203 (not shown). Slot wedge members 215 may be included to engage the slots 205, and are operative to retain the armature bars 207 in the slots 205. The armature bars 207 may comprise superconducting windings. In operation, the cooling cavities 213 transmit cooling air that is operative to cool the armature assembly 101.

Figure 3:
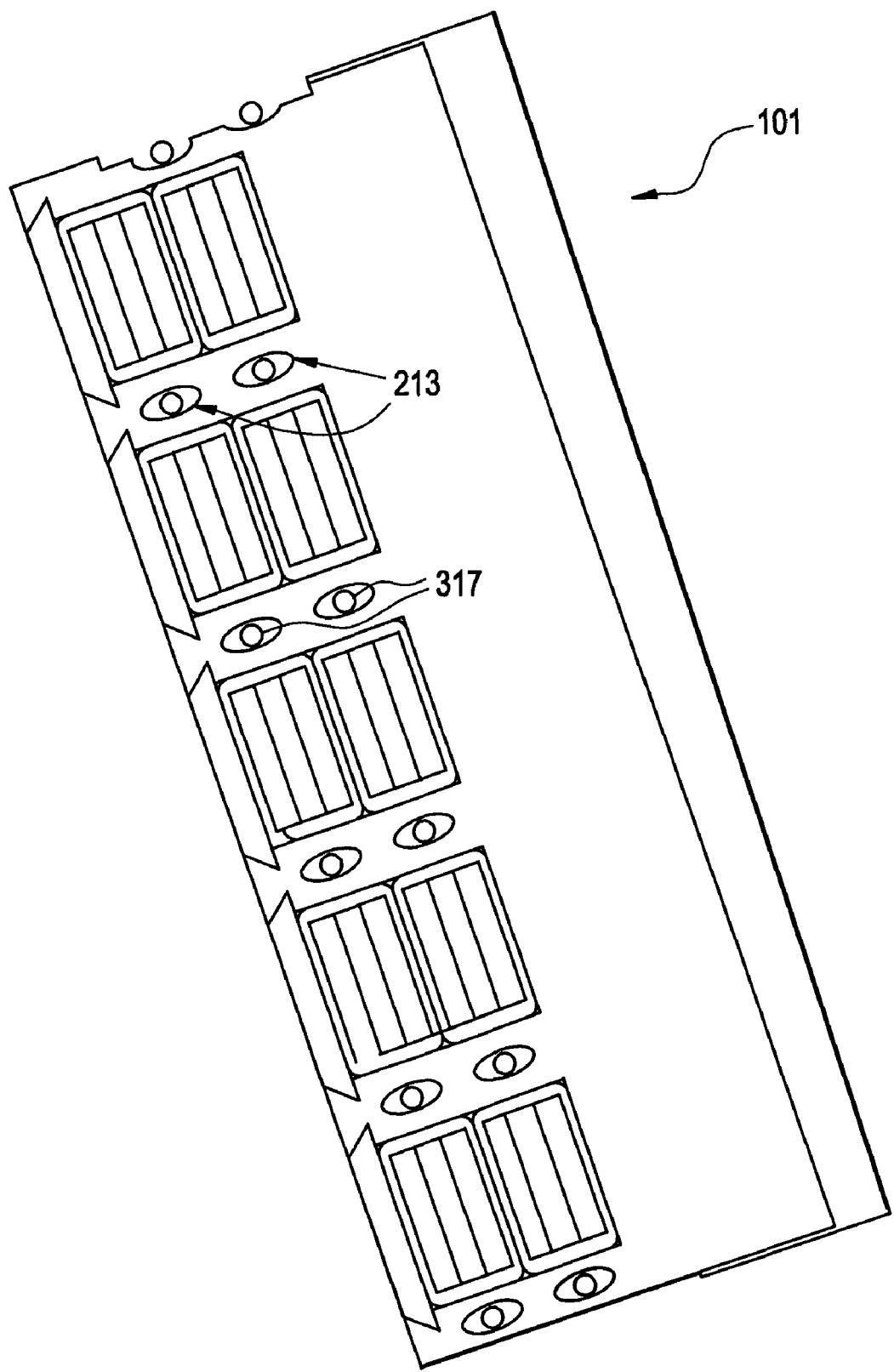
FIG. 3 illustrates a side partially cut away view of an alternate embodiment of an armature assembly of the electrical device of FIG. 1.

FIG. 3 illustrates a side partially cut-away portion of an alternate exemplary embodiment of the armature assembly 101. In the illustrated embodiment, the cooling cavities 213 are engaged with tube members 317 that are operative to receive a liquid coolant. In operation, the liquid coolant flowing through the tube members 317 cools the armature assembly 101. The embodiments illustrated in FIGS. 2 and 3 show non-limiting examples of cooling cavities 213. Other embodiments may include more or less numbers of cooling cavities 213.

Figure 4:
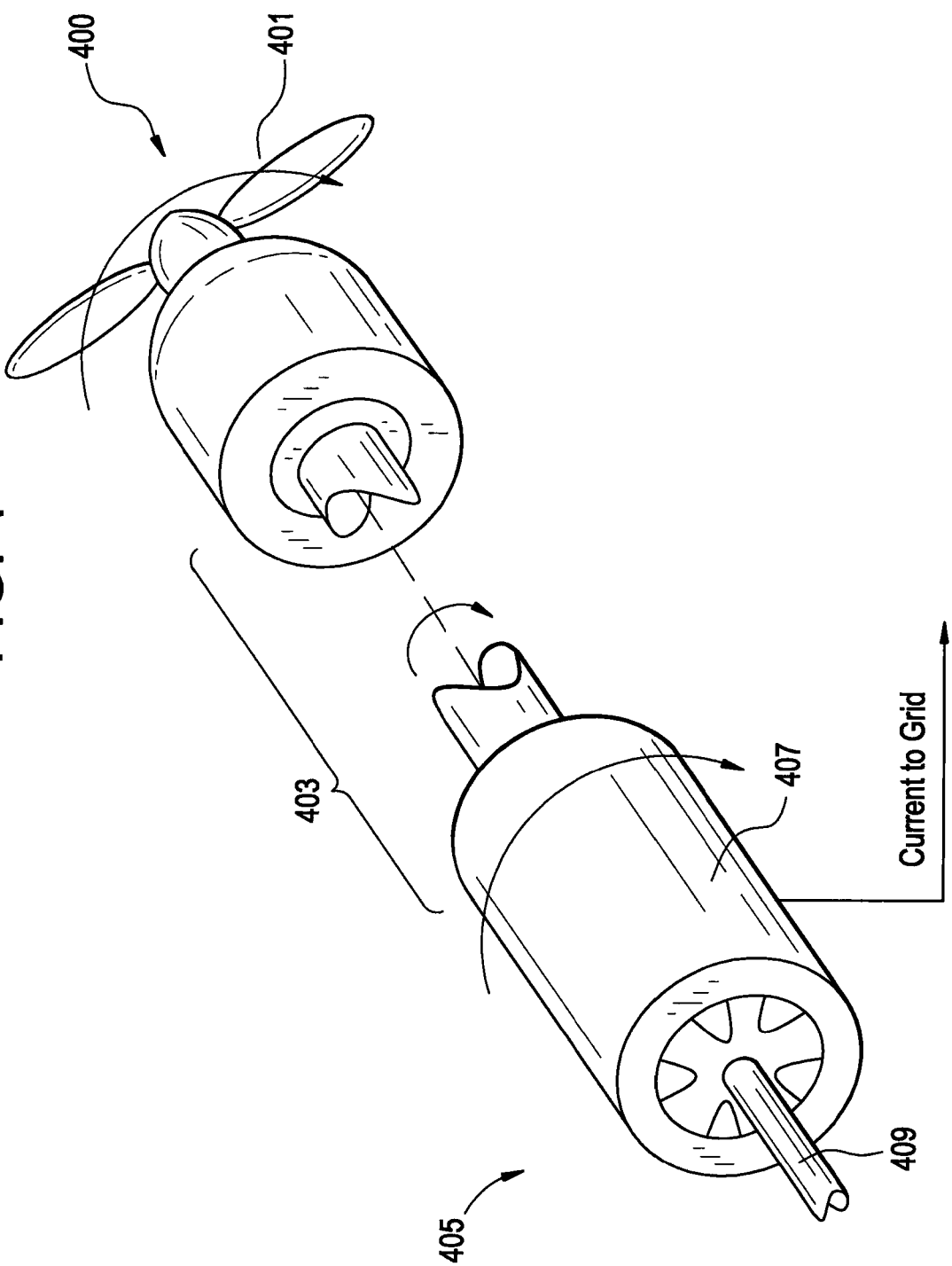
FIG. 4 illustrates a perspective view of an exemplary embodiment of a superconducting electrical generator system.

FIGS. 4-7 illustrate embodiments of systems having armature assemblies similar to the armature assembly 101. Referring to FIG. 4, a superconducting electrical generator system 400 is shown including a blade assembly 401 (a prime mover) mechanically linked to a mechanical linkage 403. A superconducting electrical generator 405 including an armature assembly 407 similar to the armature assembly 101 mechanically linked to the mechanical linkage 403, and a field assembly 409. In operation, the blade assembly 401 is rotated by wind power. The mechanical linkage 403 is rotated, and in turn, rotates the armature assembly 407. The field assembly 409 remains stationary. The interaction of flux in the superconducting electrical generator 405, and the rotation of the armature assembly 407 generates electrical current that may be sent to, for example, a power grid. Though the prime mover in FIG. 4 includes wind blades, the prime mover may be any other type of device, such as, for example, an engine that is operative to output mechanical energy.

Figure 5:
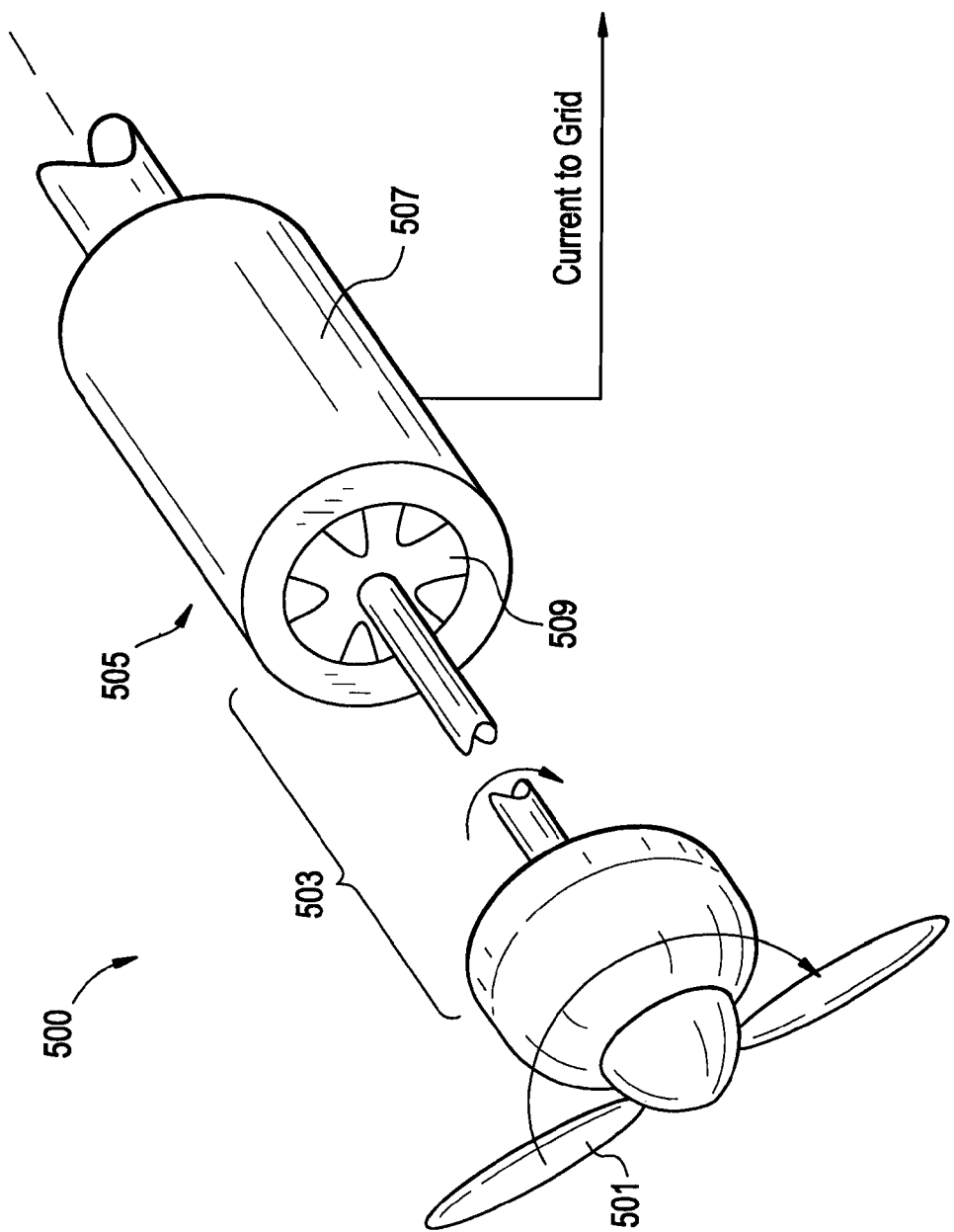
FIG. 5 illustrates a perspective view of an alternate exemplary embodiment of a superconducting electrical generator system.

FIG. 5 illustrates an embodiment of an electrical generator system 500 that is similar to the superconducting electrical generator system 400 (of FIG. 4). The superconducting electrical generator system 500 is shown including a blade assembly 501 (a prime mover), mechanically linked to a mechanical linkage 503. A field assembly 509 of a superconducting electrical generator 505 is mechanically linked to the mechanical linkage 503. The superconducting electrical generator 505 includes an armature assembly 507. In the illustrated embodiment, the stator assembly 507 remains stationary in operation, while the field assembly 509 is rotated by mechanical energy received from the blade assembly 501 via the mechanical linkage 503. The superconducting electrical generator outputs electrical current similarly to the current generation of the superconducting electrical generator system 400 (of FIG. 4).

Figure 6:
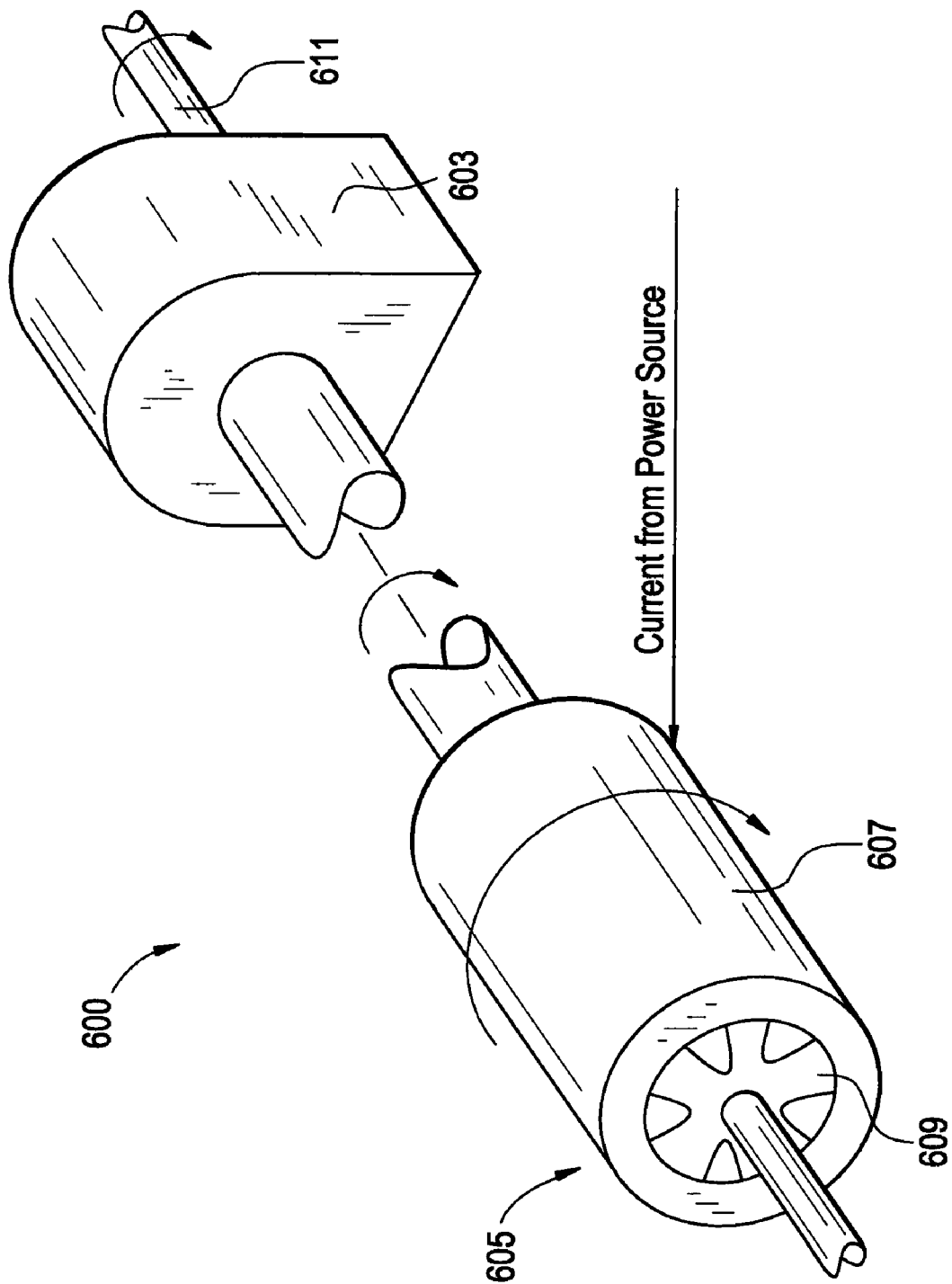
FIG. 6 illustrates a perspective view of an exemplary embodiment of a superconducting electrical motor system.

FIG. 6 illustrates a perspective partially cut-away view of an exemplary embodiment of a superconducting electrical motor system 600. The superconducting electrical motor system 600 includes a superconducting motor 605 including an armature assembly 607 that is similar to the armature assembly 101 described above, and a field assembly 609. The armature assembly 607 is mechanically linked to a mechanical linkage 603. In operation, the superconducting motor 605 receives current from a power source, such as, for example, a generator (not shown). The current induces a flux in the superconducting motor 605 that is operative to rotate the armature assembly 607. The mechanical linkage 630 rotates, and may be connected to, for example, a shaft 611.

Figure 7:
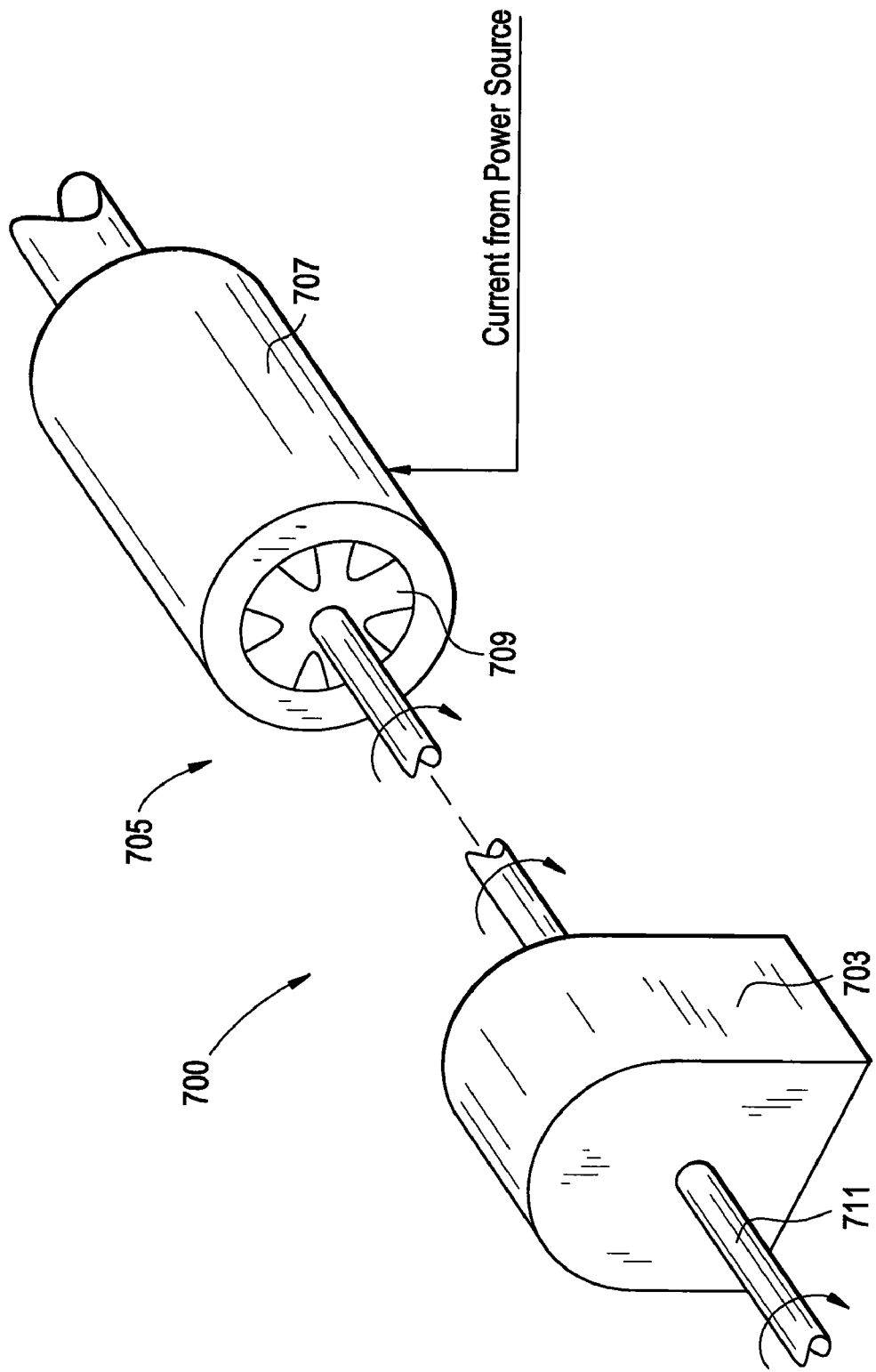
FIG. 7 illustrates a perspective view of an alternate exemplary embodiment of a superconducting electrical motor system.

FIG. 7 illustrates a perspective partially cut-away view of an exemplary embodiment of a superconducting electrical motor system 700. The superconducting electrical motor system 700 includes a superconducting motor 705 that includes an armature assembly 707 and a field assembly 709. The armature assembly 707 is similar to the armature assembly 101 described above. In operation, the superconducting motor 705 receives current from a power source that induces a flux in the superconducting motor 705. The field assembly 709 rotates, and in turn, rotates the mechanical linkage 703. The mechanical linkage may be operative to rotate, for example, a shaft 711.

The embodiments illustrated above may most effectively operate at low speeds (i.e. the relative speed between the rotors and armatures) of as low as approximately 10-25 revolutions per minute. An advantage of operating at low speeds is that the AC losses of the oversaturated magnetic portions of the armatures, e.g. the teeth, are lessened, resulting in a minimal loss of efficiency. Regarding motor embodiments, the loss of mechanical output due to wasted AC current is also minimized.

This written description uses examples to disclose the embodiments, including the best mode, and also to enable practice of the embodiments, including making and using any devices or systems and performing any incorporated methods. The patentable scope of the embodiments is defined by the claims, and may include other examples. Such other examples are intended to be within the scope of the claims if they have structural elements that do not differ from the literal language of the claims, or if they include equivalent structural elements with insubstantial differences from the literal languages of the claims.

What is claimed:
1. A system for generating power comprising:
  a superconducting generator including:
  a field assembly including a superconducting field winding configured to produce an electromagnetic field coupled to an armature assembly of the generator, the field assembly and the armature assembly arranged to rotate with respect to one another;
  the armature assembly comprising:
    a magnetic body portion;
    a magnetic tooth portion having a front surface and a rear surface, wherein the tooth portion is an extension of the magnetic body portion of the armature assembly, which is a laminated assembly, wherein the laminated armature assembly carries an alternating current (AC), wherein the electromagnetic field coupled to the armature assembly is sufficiently intense to cause at least the tooth portion to operate in a magnetically saturated condition;
    a slot partially defined by the magnetic body portion and the magnetic tooth portion;
    an armature bar engaging the slot; and a cooling cavity partially defined by the tooth portion, the cooling cavity communicative with the front surface and the rear surface of the tooth portion to cool the armature bar.

2. The system of claim 1, wherein the armature assembly further comprises an insulator portion disposed between the armature bar and the slot, operative to electrically insulate the armature bar.

3. The system of claim 1, wherein the system further comprises a prime mover mechanically linked to the armature assembly, operative to rotate the armature assembly.

4. The system of claim 3, wherein the prime mover is rotated by wind power.

5. The system of claim 1, wherein the system further comprises:
a prime mover mechanically linked to the field assembly operative to rotate the field assembly.

6. The system of claim 5, wherein the prime mover is rotated by wind power.

7. The system of claim 1, wherein the cooling cavity is operative to receive air operative to cool the armature assembly.

8. The system of claim 1, further comprising tube members engaging the cooling cavity operative to carry a liquid coolant.

9. The system of claim 1, wherein a relative rotational speed between the field assembly and the armature assembly comprises a range from 10 revolutions per minute to 25 revolutions per minute to reduce losses due to the AC current carried by the laminated armature assembly.

10. The system of claim 1, wherein the armature bar comprises a superconducting armature bar.

11. An electrical motor system comprising:
a superconducting motor including:
a field assembly including a superconducting field winding configured to produce an electromagnetic field coupled to an armature assembly of the motor, the field assembly and the armature assembly arranged to rotate with respect to one another;
the armature assembly comprising:
a magnetic body portion;
a magnetic tooth portion having a front surface and a rear surface, wherein the tooth portion is an extension of the magnetic body portion of the armature assembly, which is a laminated assembly, wherein the laminated armature assembly carries an alternating current (AC), wherein the electromagnetic field coupled to the armature assembly is sufficiently intense to cause at least the tooth portion to operate in a magnetically saturated condition;
a slot partially defined by the magnetic body portion and the magnetic tooth portion;
an armature bar engaging the slot; and
a cooling cavity partially defined by the tooth portion, the cooling cavity communicative with the front surface and the rear surface of the tooth portion to cool the armature bar.

12. The system of claim 11, wherein the armature assembly further comprises an insulator portion disposed between the armature bar and the slot, operative to electrically insulate the armature bar.

13. The system of claim 11, wherein the system further comprises a mechanical linkage mechanically linked to the armature assembly, operative to rotate with the armature assembly.

14. The system of claim 11, wherein the system further comprises:
a mechanical linkage linked to the field assembly operative to rotate with the field assembly.

15. The system of claim 11, wherein the cooling cavity is operative to receive air operative to cool the armature assembly.

16. The system of claim 11, further comprising tube members engaging the cooling cavity operative to carry a liquid coolant.

17. The system of claim 11, wherein a relative rotational speed between the field assembly and the armature assembly comprises a range from 10 revolutions per minute to 25 revolutions per minute to reduce losses due to the AC current carried the laminated armature assembly.

18. The system of claim 11, wherein the armature bar comprises a superconducting armature bar.

19. An armature assembly of an electrical apparatus comprising:
a magnetic body portion;
a magnetic tooth portion having a front surface and a rear surface, wherein the tooth portion is an extension of the magnetic body portion of the armature assembly, which is a laminated assembly, wherein the laminated armature assembly carries an alternating current (AC), wherein at least the tooth portion is arranged to operate in a magnetically saturated condition in response to an electromagnetic field produced by a superconducting field winding in a field assembly of the electrical apparatus, wherein the field assembly and the armature assembly are arranged to rotate with respect to one another;
a slot partially defined by the body portion and the tooth portion;
an armature bar engaging the slot;
a slot wedge member operative to engage the slot; and
a cooling cavity partially defined by the tooth portion, the cooling cavity communicative with the front surface and the rear surface of the tooth portion to cool the armature bar.

20. The armature assembly of claim 19, wherein the armature assembly further comprises an insulator portion disposed between the armature bar and the slot, operative to electrically insulate the armature bar.

21. The armature assembly of claim 19, further comprising tube members engaging the cooling cavity operative to carry a liquid coolant.

22. The armature assembly of claim 19, wherein the armature bar comprises a superconducting armature bar.

* * * * *